United States Patent
Jover et al.

(10) Patent No.: US 8,287,798 B2
(45) Date of Patent: Oct. 16, 2012

(54) METHOD FOR BLOW-MOLDING A PACKAGING CONTAINER USING A GAS AND DEVICE FOR IMPLEMENTING SAME

(75) Inventors: Daniel Jover, Prangins (CH); Savino Storione, Versoix (CH)

(73) Assignee: Technoplan Engineering S.A., Plan-les-Ouates (CH)

( * ) Notice: Subject to any disclaimer, the term of this patent is extended or adjusted under 35 U.S.C. 154(b) by 664 days.

(21) Appl. No.: 12/063,605

(22) PCT Filed: Aug. 18, 2006

(86) PCT No.: PCT/IB2006/002250
§ 371 (c)(1),
(2), (4) Date: Feb. 12, 2008

(87) PCT Pub. No.: WO2007/023349
PCT Pub. Date: Mar. 1, 2007

(65) Prior Publication Data
US 2010/0176526 A1    Jul. 15, 2010

(30) Foreign Application Priority Data
Aug. 23, 2005   (FR) ...................................... 05 08681

(51) Int. Cl.
*B29C 49/78*     (2006.01)
*B29C 49/16*     (2006.01)
(52) U.S. Cl. ........................ 264/529; 264/523; 264/40.3
(58) Field of Classification Search .................. None
See application file for complete search history.

(56) References Cited

U.S. PATENT DOCUMENTS

| 3,400,636 | A |   | 9/1968  | Schneider |
| 4,488,863 | A | * | 12/1984 | Collette ......................... 425/530 |
| 4,830,810 | A | * | 5/1989  | Ufer et al. .................... 264/40.1 |
| 5,035,604 | A | * | 7/1991  | Rathman et al. .............. 425/525 |
| 5,173,241 | A |   | 12/1992 | Shibuya et al. |
| 2,662,631 | A |   | 4/1993  | Collombin et al. |
| 5,585,066 | A |   | 12/1996 | Weiss |
| 5,648,026 | A |   | 7/1997  | Weiss |
| 7,320,586 | B2 |  | 1/2008  | Storione et al. |
| 2004/0173949 | A1 | * | 9/2004 | Storione et al. ............... 264/529 |

FOREIGN PATENT DOCUMENTS

| EP | 0 039 929 A | 11/1981 |
| EP | 1 518 658 A | 3/2005  |

(Continued)

*Primary Examiner* — Monica A Huson
(74) *Attorney, Agent, or Firm* — Frommer Lawrence & Haug LLP; Ronald R. Santucci

(57) ABSTRACT

The invention relates to a method of gas blow forming packaging in a mould using a preform and comprising recovery of the blow gas. The inventive method comprises the following steps consisting in: —) pre-blowing the gas into the preform at a first pressure (P1); —) blowing the gas into the pre-blown packaging at a second pressure (P2) which is greater than the first pressure (P1); —) blowing the gas into the partially-blown packaging at a third pressure (P3) which is greater than the second pressure (P2); —) recovering the gas in a recovery volume until a pre-determined pressure is obtained in the packaging or for a pre-determined period of time; —) using the recovered gas in order to preform pre-blowing operations and the first blowing step; and expanding the air that is free of residual gas in the packaging during and after the recovery phase. The invention also relates to a device that is used to implement said method.

5 Claims, 3 Drawing Sheets

FOREIGN PATENT DOCUMENTS

| | | |
|---|---|---|
| FR | 2 662 631 A | 12/1991 |
| JP | 11-207808 | 8/1999 |
| WO | WO 96/25285 | 8/1996 |
| WO | WO 03/009993 | 2/2003 |
| WO | WO 2005/092594 | 10/2005 |
| WO | WO 2005/097466 | 10/2005 |

* cited by examiner

Fig.2
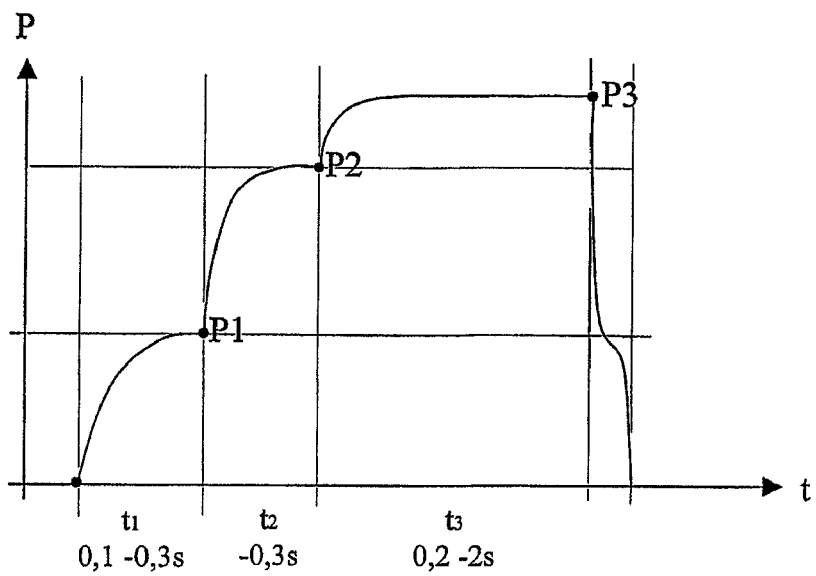
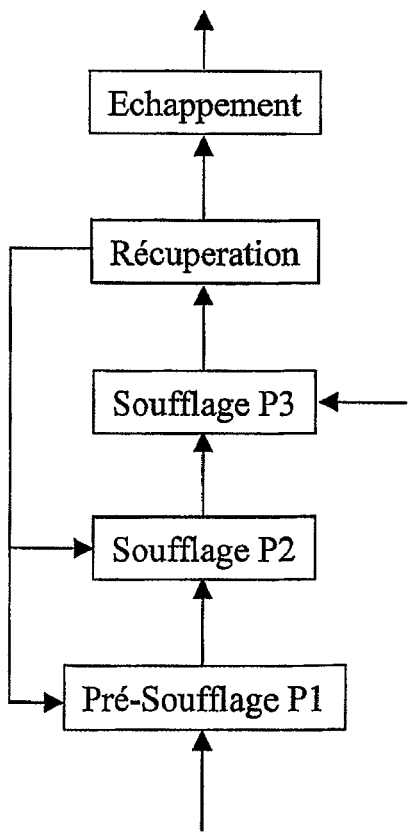
Fig.3

METHOD FOR BLOW-MOLDING A PACKAGING CONTAINER USING A GAS AND DEVICE FOR IMPLEMENTING SAME

This application is a 371 of PCT/IB2006/002250 filed on Aug. 18, 2006, published on Mar. 1, 2007 under publication number WO 2007/023349 Al which claims priority benefits from French Patent Application Number 0508681 filed Aug. 23, 2005, the disclosure of which is incorporated herein by reference.

The present invention relates to a method for blow-molding a packaging container, such as a bottle, by means of a gas in a mold starting from a preform and for recovering the blow-molding gas for its reuse, and also to a device for implementing the method.

The present invention also relates to a device for blow-molding packaging containers, in particular bottles, starting from a preform by means of a gas, such as air, and for recovering said gas for its reuse, comprising at least means for supplying the device with gas at a pre-molding pressure and at two blow-molding pressures, in order to implement the method.

BACKGROUND OF THE INVENTION

Numerous problems exist in the field of blow-molding installations for packaging containers, such as bottles, made of synthetic material. First of all, in order to effect the blow-molding of the containers into a mold, a gas, such as air, must be available under a high pressure of the order of 40 bar. In order to compress the required gas, compressors are conventionally used. However, according to some blow-molding methods, a pre-molding of a preform, which will be transformed into a container, is firstly carried out, followed by the blow-molding process per se. The pre-molding is performed under a pressure of around 10 bar, then the blow-molding process reaches a pressure of 40 bar. A first way to obtain these two working pressures is to use two compressors, one to generate the pressure of 10 bar and the other to generate the pressure of 40 bar. However, the use of two compressors is costly both in terms of initial investment for their purchase and in terms of maintenance.

Another way of proceeding is to only use one compressor that compresses the gas to 40 bar, then to regulate a part of the compressed gas to 10 bar for the pre-molding operation. This method is not very advantageous either since energy is wasted in compressing a gas whose pressure is reduced without having used it in the manufacturing process.

Moreover, once the container has been formed by blow-molding, the compressed gas used (which is at a pressure of around 40 bar) is released into the open air which represents a waste of energy.

Thus, it has proved to be necessary to improve the known methods and machines in order to enhance their efficiency and to reduce this energy wastage.

DESCRIPTION OF THE PRIOR ART

Machines and methods allowing the manufacture of packaging containers, in particular of bottles made of PET, by blow-molding are known in the prior art. The French patent application 2 662 631, that may for example be referred to, describes such a machine and such a method. According to the method described, a preform fixed to an air distribution system is brought into a mold, the distribution system is connected to a compressed air source, said air being introduced into the preform in such a manner as to flatten the walls of the preform against the edges of the mold, thus forming the desired container. In the method described in this application, an extrusion cylinder is also used whose action combined with that of the compressed air allows the balance between the axial and transverse deformation of the preform to be autoregulated which results in a combined extrusion—and blow-molding process. In the machine described in this patent application, the compressed air blown into the preform is also used to actuate the extrusion cylinder. Once the container has been formed, the blow-molding air is evacuated into the open air.

The prior art publication WO 96/25285 describes another method for blow-molding packaging containers, such as for example bottles, starting from a preform. According to the known method, a preform is pre-molded under a pressure in the range between 8 and 12 bar, then the blow-molding process per se is carried out by injecting air at 40 bar. In this document also, the blow-molding gas is released into the open air once the container has been formed.

The patent application EP 0 039 929 describes a blow-molding method for molded articles in which the blow-molding gas is recovered and recycled so as to be reused. More particularly, in this application, the blow-molding gas also plays a surface-treatment role for the internal surface of the blow-molded container, notably in order to improve the impermeability of said internal surface, and, for this purpose, it contains a suitable reagent. Once the blow-molding/treatment process has been carried out, the blow-molding gas is recovered to be reused later by means of a purge gas, where said purge gas must be purified of the reagent used.

The U.S. Pat. No. 5,173,241 describes a method and an apparatus allowing the recovery of the blow-molding air in a machine for plastic injection in order to form a packaging container. In this prior art technique, once the blow-molding process is finished, the blown air is recovered in a recovery vessel by aspiration until a negative pressure is obtained in the blow-molded container.

Other packaging container blow-molding devices and methods are known from the publications U.S. Pat. Nos. 5,648,026, 5,585,066 and U.S. Pat. No. 3,400,636.

The publication WO 03/009993 describes yet another method and a device allowing the blow-molding air to be recovered. In this blow-molding machine and according to the method, the successive operations are performed as follows:
)pre-molding;
)blow-molding and
)discharge with recovery of blow-molding gas.

Finally, in EP-A-1518658, a first pressure is used for pre-molding and a second pressure for blow-molding. After the blow-molding formation process, a blow-out of the inside of the container is performed under a lower pressure than the blow-molding pressure. After the blow-molding operation, a part of the gas can be recovered in a volume for a subsequent use.

The gas is recovered via a recovery valve into a recovery volume and is used to actuate extrusion cylinders, consumers of the packaging container production machine or returned into a factory compressed air circuit.

With the recovery system of WO 03/009993, only the pre-molding gas, such as air, is supplied by the recovery system which is linked to the fact that the recovery pressure is higher than the pre-molding pressure. This allows air to be supplied, after regulation, at the pre-molding pressure.

Since the blow-molding pressure is always higher than the recovery pressure, it would not appear to be possible to use the recovered air for the blow-molding.

SUMMARY OF THE INVENTION

One goal of the invention is to improve the known devices and methods.

More particularly, one subject of the present invention is a blow-molding machine with recovery of the blow-molding gas that is simple to operate and easy to adjust.

Another object of the invention is to optimize the blow-molding air recovery in the machine and to reduce its power consumption and the maintenance required.

A further object of the invention is to improve the recycling of the blow-molding gas.

In the present invention, it is proposed that the recovered gas, for example air, is used solely for the pre-molding and blow-molding operations and not for other applications as is taught by the prior art.

The process according to the invention comprises the following steps:
)pre-mold blowing of the gas under a first pressure (P1);
)blow-mold blowing of the gas under a second pressure (P2) higher than the first pressure (P1);
)recovery of the gas in a recovery volume until a pre-determined pressure is reached in the container; and it is characterized by the following steps:
)blow-mold blowing of the gas under a third pressure (P3) higher than the second pressure (P2) before the step for
)recovering the gas in a recovery volume until a pre-determined pressure is reached in the container or for a pre-determined time and use of the recovered gas for carrying out the pre-molding and the first blow-molding step operations;
)release into the open air of the residual gas in the container during and after the recovery phase.

Thus, in the recovery system according to the invention, recovered gas is supplied both for the pre-molding operation and for a part of the blow-molding operation. Indeed, for this part of the blow-molding operation, the pressure of the blow-molding gas will at the most be equal to the recovery pressure. Then, a "top up" of blow-molding gas is supplied under high pressure in order to reach the desired blow-molding pressure.

In other words, the pre-molding pressure is obtained in a similar manner to WO 03/009993, then when the pre-molding is finished, a first blow-molding valve opens and the air used for the first blow-molding phase is that contained in a recovery reservoir. Once a given blow-molding pressure is reached in the container, or after a certain time, a second blow-molding valve is opened and the pressure in the blow-molded object increases to reach the final pressure required to form the object in question.

The advantage of the method and of the system according to the invention resides in the fact that the quantity of air, or of blow-molding gas, supplied by the recovery system is used not only for the pre-molding but also for carrying out a part of the blow-molding process. This results in both a better use of the recovered air, which is not regulated to a lower pressure in order to be recycled for example in the factory system or for actuating extruding tools, and also a reduction in the quantity of compressed air required to reach the pre-determined final pressure, since instead of going from the pre-molding pressure to the final blow-molding pressure, an intermediate blow-molding step is included, after the pre-molding step, which is generated by recovered gas.

Another advantage resides in the fact that the invention may be installed on existing machines which also reduces the modification costs.

Typically, the pressure values to be envisioned according to the invention are:

)first pressure, for pre-molding, between 4 and 16 bar (P1);
)second pressure, for the first blow-molding phase (recovery pressure): around 18 bar (P2=maximum recovery pressure);
)third pressure, final blow-molding phase, from around 30 to 40 bar (P3).

As can be clearly seen, it was necessary in the past to supply blow-molding gas under pressure in order to go from the pre-molding pressure P1 to the final pressure P3, this gas being obtained by the use of high-pressure compressors which are very costly to purchase and to maintain.

With the system according to the invention, it is only necessary to provide a "top up" between the first blow-molding phase, this state being obtained with recovered gas only, and the final pressure of around 30 to 40 bar. In a given installation, this allows the electrical power consumption, or even the number of compressors used, to be reduced which results in a significant saving.

The method according to the invention for blow-molding a packaging container by means of a gas in a mold starting from a preform and for recovering the blow-molding gas, comprises at least the following steps:
)pre-mold blowing of the gas under a first pressure into the preform;
)blow-mold blowing of the gas under a second and a third pressure into the preform in order to obtain the packaging container;
)recovery of the gas under the second pressure until a pre-determined pressure is obtained in the container;
)holding of the recovered gas under a recovery pressure;
)release into the open air of the residual gas in the container;
)use of the recovered gas to carry out the pre-molding and to perform the first blow-molding step.

The pre-molding step lasts for between 0.1 s and 0.3 s.

The blow-molding step under the second pressure lasts for up to 0.3 s.

The blow-molding step under the third pressure lasts for between 0.2 s and 2 s.

A further subject of the invention is a device for implementing the method designed for the blow-molding of packaging containers, in particular bottles, in a mold starting from a preform, by means of a gas and of recovery of said gas, comprising at least means for supplying the device with gas under a first pressure and under a third pressure, means for extruding from the container forming means, means for recovering said gas comprising at least one recovery volume associated with a recovery valve, means for controlling said recovery means and said valve and adjustment means allowing the operation of said control means to be adjusted, characterized in that the device also comprises means for blow-molding supply under a second blow-molding pressure from said recovery volume.

According to one embodiment, said device is characterized in that the means for blow-molding supply under a second blow-molding pressure from said recovery volume comprise a valve and a conduit.

DESCRIPTION OF THE DRAWINGS

The invention will be better understood from the description of embodiments of the latter and from the figures that relate to them.

FIG. 2 shows schematically a blow-molding curve according to the method of the invention.

FIG. 3 shows a block flow diagram of the method according to the invention.

DESCRIPTION OF THE PREFERRED EMBODIMENT(S)

Figure 1:
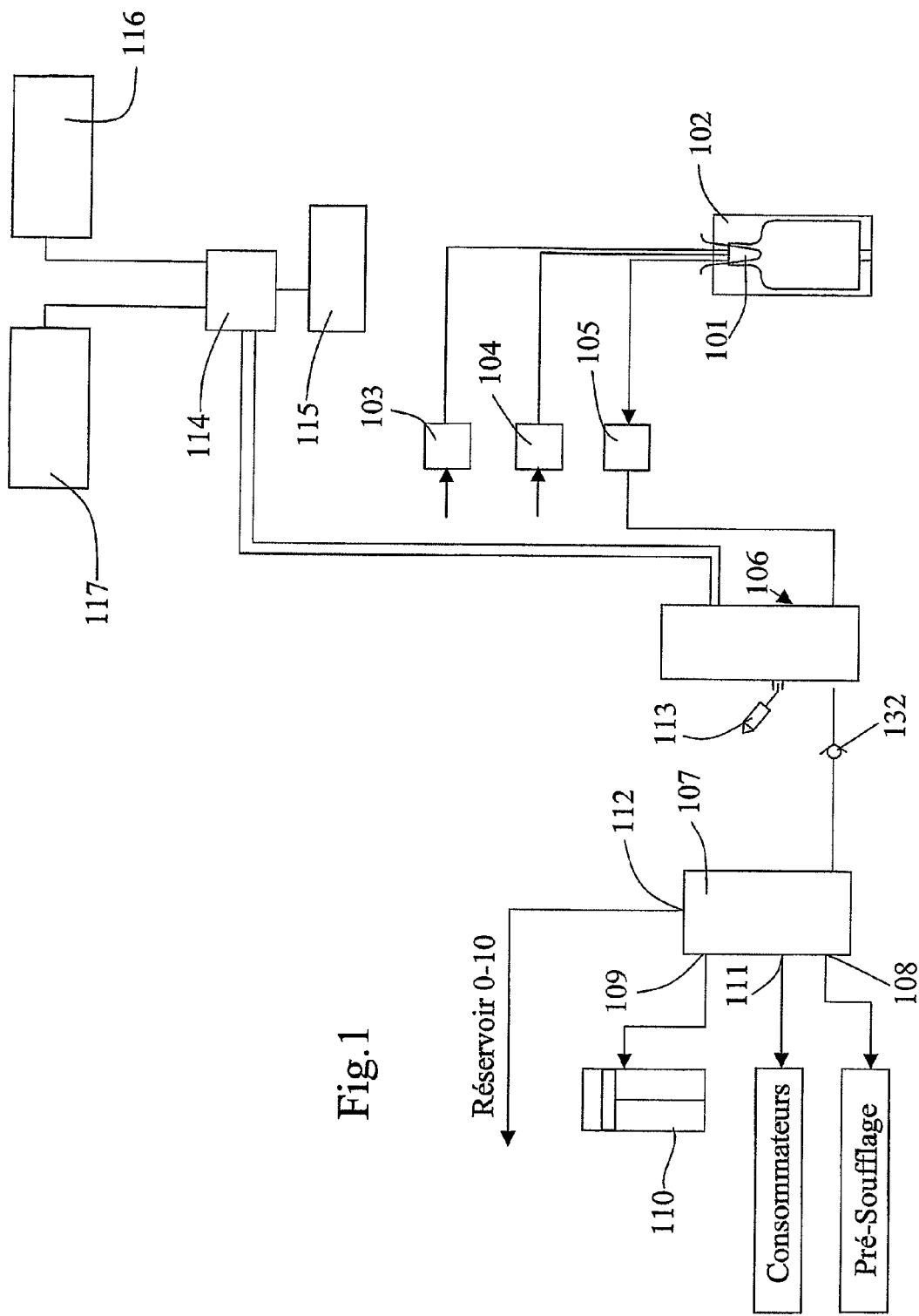
FIG. 1 shows a block diagram of a machine known from the prior art.

The principle of a blow-molding machine is first of all described with reference to FIG. 1. In this figure, the blow-molding machine is a machine known per se in the prior art and such as described in the publication WO 03/009993. In this machine, as indicated hereinabove, a gas, for example air, is supplied under a first pressure, referred to as pre-molding pressure, in the range between 4 and 16 bar, for the pre-molding of a preform 101 in the mold 102 via a pre-molding valve 103, then the gas is introduced under a second pressure, referred to as blow-molding pressure, of around 25 to 40 bar, for the blow-molding process itself of the packaging container in the mold 102, via a blow-molding valve 104. The blow-molding pressure depends in particular on the complexity of the packaging container to be blow-molded: the simpler the shape and without any particular details, the lower the blow-molding pressure can be. Once the container has been blow-molded, the gas in the container, which is under the blow-molding pressure, is recovered via a discharge valve 105 and a recovery valve 106 in a recovery volume 107. This recovery volume 107 may be formed by one reservoir or several reservoirs or else by a conduit of a suitable volume serving as a reservoir. In order not to slow down the production cycle of the machine, only a part of the gas under the blow-molding pressure is recovered, the rest of the gas being evacuated via a silent exhaust 113 from the valve 106 into the open air.

In the known machines, the blow-molding gas is recovered until it reaches a pressure of around 17 bar in the blow-molded container, the remainder of the release occurring into the open air via the exhaust 113.

In the prior art, this recovered gas is then recycled for various uses. A first use that can be made is to reuse this gas under pressure for the pre-molding operation. Thus, the recovery volume can, on the one hand, be connected to the pre-molding circuit, schematically represented by the expression "pre-molding" and the outlet 108, for example in a pre-molding reservoir, not shown in the figure, which will be situated before the pre-molding valve 103 in the machine circuit. Depending on the average recovery pressure obtained and on the pre-molding pressure under which the machine operates, it will be necessary to insert a regulator between the recovery volume 107 and the pre-molding reservoir in order to regulate the recycled gas to the effective pre-molding pressure. These parameters often depend on the production machine and must be adjusted on a case by case basis.

A second use that can be made of the recovered gas is for actuating extrusion cylinders 110 for the preform. As indicated above, generally speaking, the pre-molding and/or blow-molding are both combined with a longitudinal extrusion of the preform 101 by means of said extrusion cylinder 110 in order to combine a transverse and axial deformation of the preform. These cylinders are actuated either mechanically by a cam, or by means of a gas under a pressure in the range from around 7 to 10 bar. Thus, the volume may also be connected to the control circuit of the extrusion cylinders 110, where necessary via a pressure regulator (not shown) in order to bring the gas to the pressure used for actuation of the cylinders 110. This use is represented schematically by the outlet 109 from the recovery volume 107 and the cylinder 110.

A third use of the recovered gas is for actuating other elements that are consumers of the blow-molding machine, which is represented schematically by the word "consumers" in FIG. 1 and the outlet 111 from the recovery volume 107.

A fourth use that may be made of the recovered gas is to return it to the common gas supply, notably air supply, conduits for the premises where such machines are installed and also for supplying the compressor of the blow-molding machine providing the compression of the gas to 40 bar. Indeed, such industrial premises always use compressed gas for actuating machines and miscellaneous devices and, as such, compressed gas is always useful. This use is represented schematically by the outlet 112 from the recovery volume and by the expression "Reservoir 0-10" in FIG. 1.

In the known blow-molding method are found the following steps (with reference to FIG. 1):

)the pre-molding valve 103 is opened, the pre-molding is carried out under a first pressure of the gas (for example between 4 and 16 bar) in the preform 101 and the valve 103 is closed;

)the valve 104 is opened, the blow-molding is carried out under a second pressure of the gas (for example between 25 and 40 bar) in the preform in order to obtain the packaging container and the blow-molding valve 104 is closed;

)the discharge valve 105 is opened and the gas under the second pressure is recovered in a recovery volume 107 via the recovery valve 106 until a third pre-determined pressure is obtained within the blow-molded container;

)as soon as the third pre-determined pressure is reached, the recovery valve 106 is closed and the rest of the blow-molding gas still under pressure in the container is released into the open air.

The blow-molded packaging container is subsequently removed from the blow-molding machine and continues its manufacturing cycle.

As indicated hereinabove, in the method according to the invention, the recovered gas is conserved for two uses: the pre-molding and a part of the blow-molding process. For this purpose, the blow-molding gas is recovered until a pressure of around 20 bar is obtained in the recovery volume so as to be able to reuse this gas for a part of the blow-molding process, without losing it for other uses in contrast to what is taught in the prior art.

The method according to the invention is represented schematically in FIG. 2 in the form of a graph on which the blow-molding pressure/time curve of a machine according to the invention is shown and in the block flow diagram in FIG. 3.

First of all, the method begins with the pre-molding process as described hereinabove until a pressure P1 of around 4 to 16 bar is obtained in the packaging container. This step generally lasts for around t1=0.1 s to 0.3 s.

Then, once this step has been carried out, a first part of the blow-molding process is performed until a pressure P2 of around 20 bar is obtained with recovered gas supplied by a recovery volume. This step generally lasts for a maximum of t2=0.3 s. The end of this step may be chosen to be either when a given pressure (for example 20 bar) is reached, or after a certain time.

Finally, the blow-molding of the container is finished by supplying gas under a high pressure in order to arrive at the final blow-molding pressure P3 of around to 40 bar. This third step generally lasts for around t3=0.2 s–2 s.

Once the blow-molding pressure P3 has been obtained, or after a certain time, the gas present in the container is discharged and recovered by the recovery means such as described in the patent application WO 03/009993 for its use as blow-molding gas in the manner described hereinabove.

The blow-molding machine allowing the method according to the invention to be implemented is now described with reference to FIG. 4.

This machine comprises a mold 1 holding the packaging container 2 which is formed by blow-molding, a recovery volume 3 in which the blow-molding gas is recovered and a high-pressure gas supply 4. In the description that follows, it will be considered that the machine is in operation and that the recovery volume contains gas under pressure. For the pre-molding process, a pre-molding valve 4 is opened and the gas contained in the volume 3 flows through the conduit 5 via a pressure regulator 6 into the preform that will become the packaging container 2.

When the pre-molding operation is finished, the pre-molding valve 4 is closed and a first blow-molding valve 7 is opened which allows gas contained in the volume 3 to flow via the conduit 8 without flowing through a regulator into the partially-molded container that will become the packaging container 2. Once this first part of the blow-molding process is finished, the blow-molding valve 9 is opened and the high-pressure gas (for example at 40 bar) is blown from the supply 40 into the partially-molded container that will become the packaging container 2.

When the blow-molding operation is finished, the valves 7 and 9 are closed and the exhaust valve 10 and the recovery valve 10' are opened, which allows the blow-molding gas to be recovered in the recovery volume 3 via the conduit 11, in the manner described in the publication WO 03/009993. Once the pressure has fallen to the required value in the container 2, or after a certain time, the rest of the evacuation is carried out into the open air via the silencer 12.

The conduits 5, 8, 11 also comprise the anti-return valves 13, 14 and 15 for blocking the flow of the blow-molding gas in the appropriate manner and in the case of non-simultaneous operation of the valves.

For the start-up of the machine, when the recovery volume 3 does not contain any blow-molding gas recovered with sufficient pressure, or when the recovery system is inoperative, the supply for the pre-molding and blow-molding operations comes directly from the high-pressure supply 4, via a regulator 16 which is connected to the conduit 5 via the conduit 17. This conduit 17 also comprises an anti-return valve 18. This manner of operation allows the whole system to be pressurized or the machine to be kept in operation even if recovery is not used. The pressure at the outlet of the regulator is around 8 bar which allows a pressure of around 7 bar, required to perform pre-molding, to be obtained at the outlet of the regulator 6. In such a mode of operation, the blow-molding process is carried out in a single operation.

Subsequently, when the machine is in operation, the recovery system, in particular the recovery volume 3, climbs in pressure over the course of the cycles and gradually the pressure in the recovery volume becomes sufficient to allow the first part of the blow-molding process such as described hereinabove.

Figure 4:
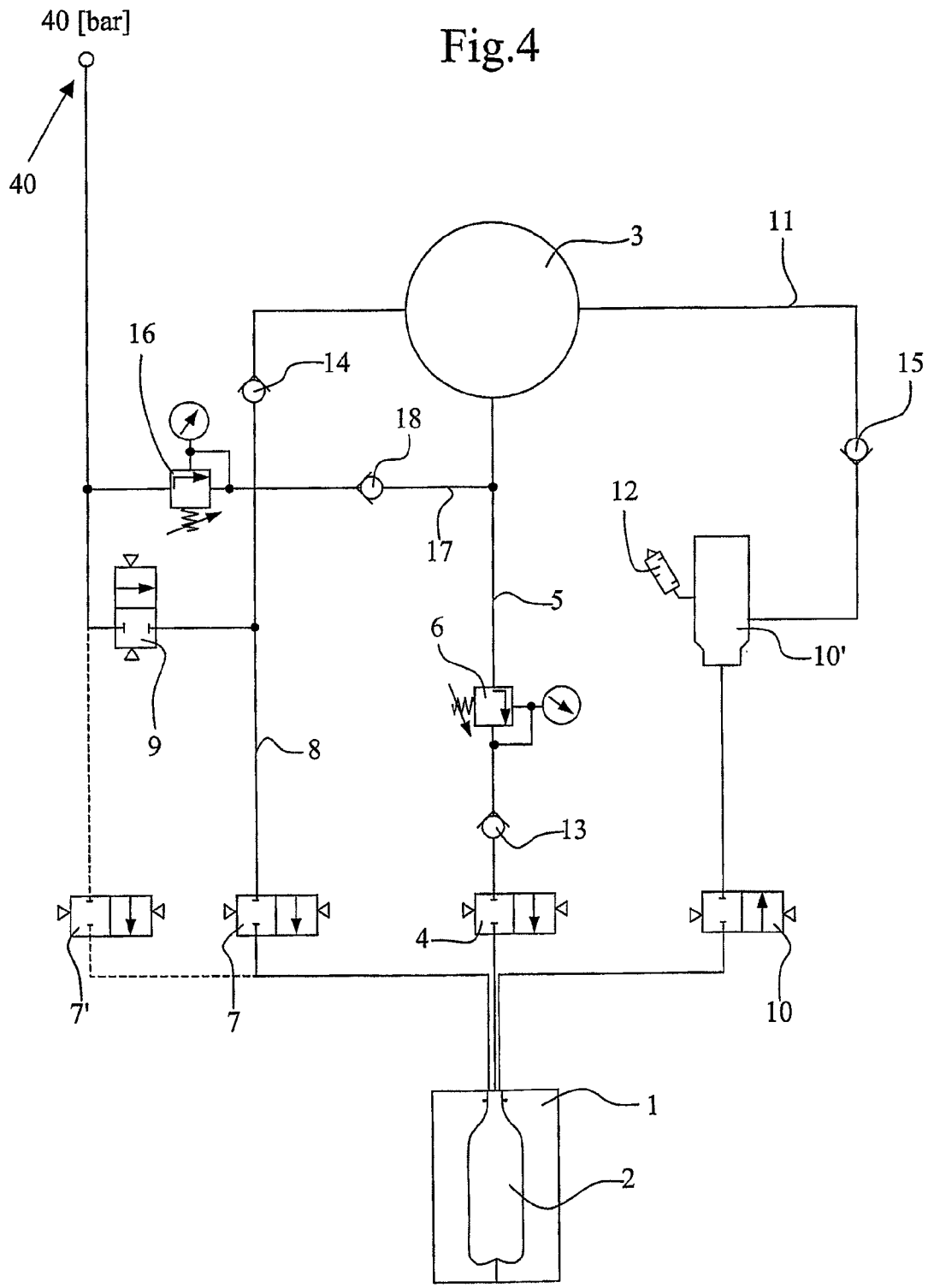
FIG. 4 shows a blow-molding machine according to the invention.

In FIG. 4, the valves 7 and 9 for the blow-molding stages under an intermediate pressure and under a final pressure are shown in series. In one variant, shown with dashed lines, these valves 7 and 9 may also be placed in parallel.

In principle, the various valves of the system operate simultaneously. These valves are of a standard type such as are known in the prior art. Furthermore, the valve 10' may be a valve such as is described in the publication WO 03/009993.

These valves are controlled by mechanical means known per se comprising, for example, a cam actuating a distributor that controls the position of said valve.

These control means can be mechanical and/or associated with electrical means and with sensors.

In a similar manner, the extrusion means and the means for forming the packaging container starting from the preform are known per se from the relevant prior art.

It goes without saying that the embodiments described hereinabove are presented by way of non-limiting examples and variations are possible within the scope of the protection claimed by means of equivalents.

For example, the pressures indicated for the pre-molding and the blow-molding operations may vary with respect to the values given. For pre-molding, values from around 4 to 16 bar may be envisioned, for the blow-molding stage under the pressure P1, values from around 14 to 22 bar and, for the blow-molding stage under the pressure P3, values from around 30 to 40 bar may be envisioned.

The invention claimed is:

1. A method for blow-molding a packaging container by means of a gas in a mold starting from a preform and for recovering the blow-molding gas according to the following steps:
   pre-mold blowing of the gas under a first pressure (P1) in a closed mold;
   blow-mold blowing of the gas under a second pressure (P2) higher than the first pressure (P1);
   recovery of the gas in a recovery volume until a pre-determined pressure is reached in the container;
   characterized by the following steps:
   blow-mold blowing of the gas under a third pressure (P3) higher than the second pressure (P2) before the step for recovering the gas in a recovery volume until a pre-determined pressure is reached in the container or for a pre-determined time and use of the recovered gas at or below the predetermined recovery volume pressure for carrying out the pre-molding and the first blow-molding step operations;
   release into the open air of the residual gas in the container during and after the recovery phase.

2. The method as claimed in claim 1, wherein the first pressure value is between 4 and 16 bar, the second pressure value is around 18 bar and the third pressure value is between around 30 and 40 bar.

3. The method as claimed in claim 1, wherein the pre-molding step lasts for between 0.1 s and 0.3 s.

4. The method as claimed in claim 1, wherein the blow-molding step under the second pressure lasts for up to 0.3 s.

5. The method as claimed in claim 1, wherein the blow-molding step under the third pressure lasts for between 0.2 s and 2 s.

* * * * *